United States Patent
Stephenson et al.

(10) Patent No.: US 7,944,886 B2
(45) Date of Patent: May 17, 2011

(54) INFRASTRUCTURE-BASED ENABLING INDICATION FOR DYNAMIC FREQUENCY SELECTION IN WIRELESS NETWORKS

(75) Inventors: David S. Stephenson, San Jose, CA (US); Robert B. O'Hara, Jr., Santa Clara, CA (US); Brian Donald Hart, Sunnyvale, CA (US); Christopher Meil, Akron, OH (US)

(73) Assignee: Cisco Technology, Inc., San Jose, CA (US)

( * ) Notice: Subject to any disclaimer, the term of this patent is extended or adjusted under 35 U.S.C. 154(b) by 935 days.

(21) Appl. No.: 11/842,601

(22) Filed: Aug. 21, 2007

(65) Prior Publication Data

US 2009/0052382 A1 Feb. 26, 2009

(51) Int. Cl.
*H04W 4/00* (2009.01)
(52) U.S. Cl. ........................................ 370/331
(58) Field of Classification Search .................. None
See application file for complete search history.

(56) References Cited

U.S. PATENT DOCUMENTS

| 6,925,064 | B2 | 8/2005 | Hester et al. | |
| 7,400,901 | B2 * | 7/2008 | Kostic et al. | 455/525 |
| 2004/0156336 | A1 * | 8/2004 | McFarland et al. | 370/329 |
| 2007/0258393 | A1 * | 11/2007 | Cam-Winget et al. | 370/310 |

* cited by examiner

*Primary Examiner* — Raj K Jain
(74) *Attorney, Agent, or Firm* — Baker Botts L.L.P.

(57) ABSTRACT

A wireless access point selection system. In particular implementations, a method includes receiving a notification that identifies a wireless access point that detects radar on an operating channel and identifies the operating channel; updating neighbor lists of one or more neighboring wireless access points to remove the wireless access point from the neighbor list, where the neighbor list comprises neighbor wireless access points, corresponding operating channels, and corresponding enable indications, where each enable indication indicates if a channel availability check is required before performing active scanning; and transmitting the updated neighbor list to the neighboring wireless access points. In one implementation, a system provides a DFS enable indication to wireless clients so they can know whether a channel availability check is required prior to transmitting.

25 Claims, 8 Drawing Sheets

INFRASTRUCTURE-BASED ENABLING INDICATION FOR DYNAMIC FREQUENCY SELECTION IN WIRELESS NETWORKS

TECHNICAL FIELD

This disclosure relates generally to wireless networks.

BACKGROUND

Market adoption of wireless LAN (WLAN) technology has exploded, as users from a wide range of backgrounds and vertical industries have brought this technology into their homes, offices, and increasingly into the public air space. This inflection point has highlighted not only the limitations of earlier-generation systems, but also the changing role that WLAN technology now plays in people's work and lifestyles across the globe. Indeed, WLANs are rapidly changing from convenience networks to business-critical networks. Increasingly users are depending on WLANs to improve the timeliness and productivity of their communications and applications, and in doing so, require greater visibility, security, management, and performance from their network.

Spectrum regulation has required that transmitters operating in the so-called "radar channels" (5.25 to 5.75 GHz) perform a "channel availability check" prior to commencing transmissions on that channel. A channel availability check typically involves monitoring a candidate channel for 60 seconds to determine if radar transmissions are present. Typically, wireless access points perform this function as part of their initialization process. Because radar transmissions may appear at any time, wireless access points are required to continually monitor the spectrum, in a process referred to as "in-service monitoring." As spectrum regulation has given radar transmissions priority in the radar channel band, once radar transmissions are detected, wireless access points and their associated wireless clients must cease transmissions on that channel so as not to interference with radar operations.

Wireless clients are also required to perform a channel availability check prior to transmitting. Because wireless clients are mobile, they routinely roam between wireless access points covering adjacent areas in a wireless network. In 802.11 networks, wireless clients may either perform passive scanning or active scanning to determine the next wireless access point to which to associate. Wireless clients performing passive scanning scan just-in-time to receive a beacon transmission from another wireless access point if they know when the transmission will occur. Otherwise, they may have to wait for up to 100 ms, the typical beacon period, for the beacon to be transmitted assuming an access point is transmitting on the channel; if no AP is transmitting on this channel, wireless clients could potentially wait even longer. For this reason, active scanning, where a client transmits probes one or more channels, is generally preferred. However, wireless clients cannot perform an active scan on a channel without either performing a channel availability check or receiving an enabling signal from a wireless access point. Delays incurred by wireless clients while scanning can negatively impact on-going real-time traffic such as a voice or video call if they lead to an interruption in connectivity to an access point.

The channel availability check is performed for a continuous period of time using passive scanning procedures. If, while performing the channel availability check, the wireless client receives a beacon frame transmitted by a wireless access point on that channel, the client is deemed to have received an acceptable "enabling signal." Upon receipt of the beacon, the client may commence actively scanning the candidate channel.

DESCRIPTION OF EXAMPLE EMBODIMENTS

A. Overview

Particular implementations facilitate client roaming in wireless networks. According to particular implementations, the present invention provides in-service monitoring for radar transmissions operating in a given band (e.g., in the 5.25-5.75 GHz band). In particular implementations, the wireless network infrastructure indicates the in-service monitoring capability and indicates if a wireless client, being associated with a given wireless access point, may perform active scanning without being required to first perform passive scanning or perform a channel availability check prior to active scanning. This may improve the roaming performance of the wireless client, because it need not consume time required for passive scanning or a channel availability check. In one implementation, the wireless network infrastructure generates, maintains, and delivers neighbor lists to wireless access points and then to associated wireless clients. In one implementation, each neighbor list includes a list of neighboring wireless access points and corresponding Dynamic Frequency Selection (DFS) enabling bits that indicate if a channel availability check is required before performing active scanning. For example, in one implementation, the DFS enabling bit being enabled (i.e., set to "1") indicates that the channel availability check has been performed and the coverage area for the corresponding wireless access point has been determined to be radar free on that DFS channel. As such, a wireless client referencing the neighbor list would not be required to perform a channel availability check and may immediately perform active scanning on the identified channel without violating DFS spectrum regulation requirements. If the DFS enabling bit is not enabled (i.e., cleared to "0"), a channel availability check is required before performing active scanning. In particular implementations, often referred to as a "split-MAC architecture," after the wireless access point detects radar on its assigned operating channel and notifies the central controller, the central controller removes the wireless access point from the neighbor lists. In one implementation, the wireless network infrastructure pushes the updated neighbor list to the wireless access point which detected the radar signal and updated neighbor lists to the neighboring wireless access points (there may be a different, but related neighbor list for each access point). The updated neighbor lists have only channels known to be free of radar and have removed the channel on which the radar was detected so as to maintain regulatory compliance with DFS rules. In one implementation, after the central controller reassigns a new operating channel to the wireless access point and the coverage area for the wireless access point is determined to be free of radar on the channel, the central controller updates the neighbor lists to include the new channel, and sets the DFS enabling bit to "1." The central controller then pushes the updated neighbor lists to all the wireless access points.

B. Example Wireless Network System Architecture

B.1. Network Topology

Figure 1A:
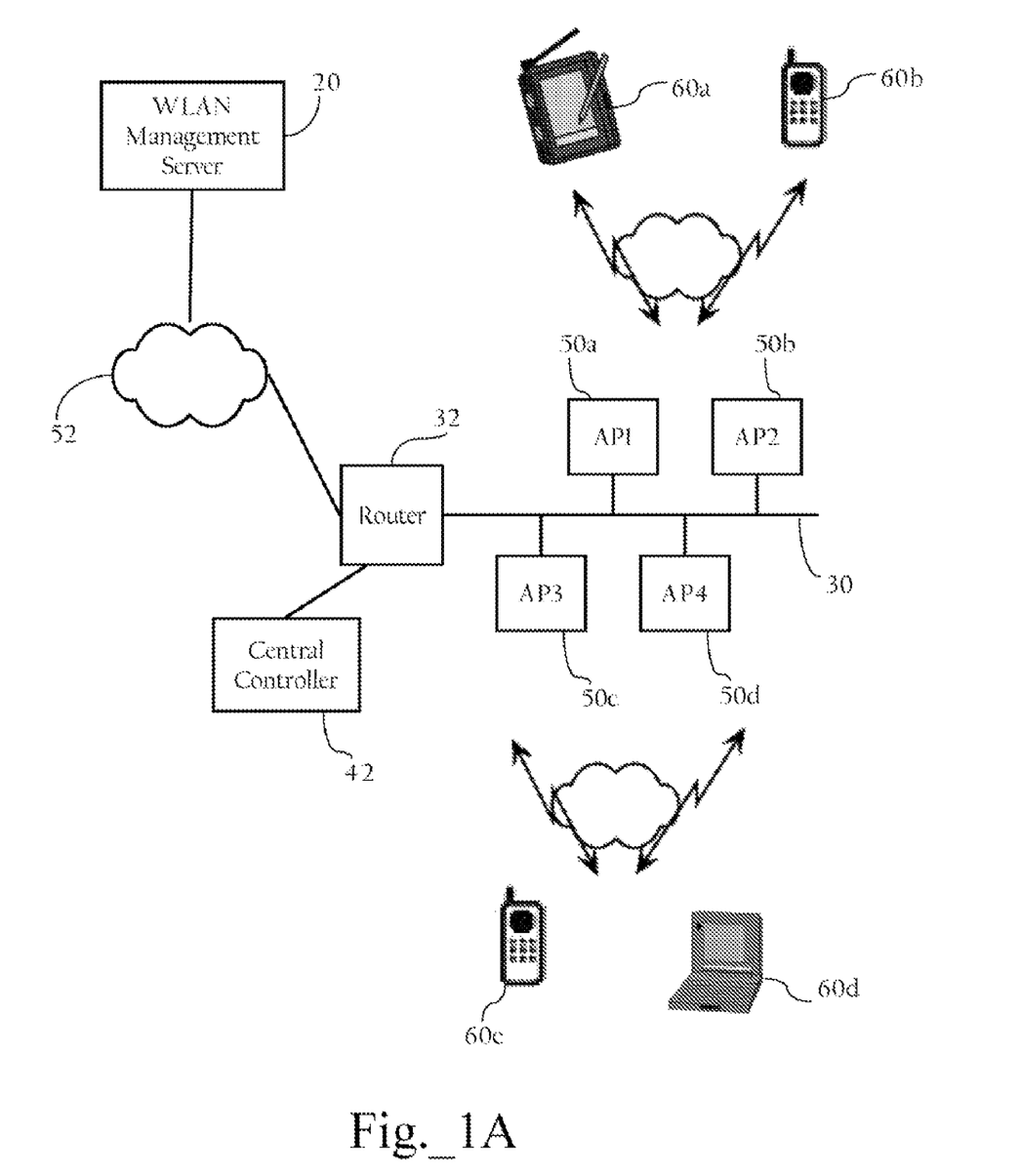
FIG. 1A illustrates example components in a wireless local area network (WLAN) system.

FIG. 1A illustrates example components in a wireless local area network (WLAN) system. In a specific embodiment of the present invention, the system includes a WLAN management server 20, a central controller 42, a local area network (LAN) 30, a router 32, and wireless access points 50a, 50b, 50c, and 50d. LAN 30 is implemented by a switch (or an array of switches) and/or other network devices, such as a bridge.

As FIG. 1A illustrates, these network elements are operably connected to a network 52. Network 52, in one implementation, generally refers to a computer network, such as a LAN, a WAN, etc., that includes one or more intermediate network devices (e.g., routers, switches, etc.), which allow for the transmission of messages between WLAN management server 20 and wireless clients via wireless access points 50. Of course, network 52 can include a variety of network segments, transmission technologies and components, such as terrestrial WAN links, satellite links, optical fiber links, and cellular links. Network 52 could also be a campus LAN. LAN 30 may be a LAN, LAN segments implemented by an Ethernet switch (not shown), or an array of switches having multiple ports to which wireless access points 50 are connected. The wireless access points 50 are typically connected to switch ports via Ethernet links; however, other link layer connection protocols or communication means can be employed. FIG. 1A illustrates one possible network environment in which the invention may operate; however, other implementations are possible. For example, although WLAN management server 20 is illustrated as being on a different LAN or LAN segment, it may be co-located with wireless access points 50.

Figure 1B:
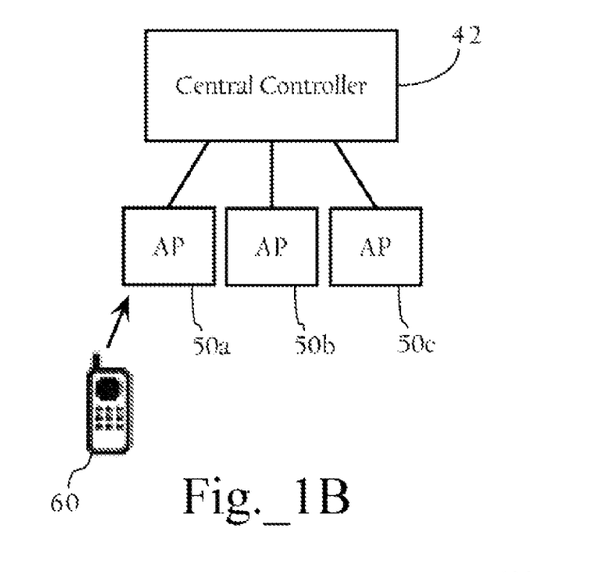
FIG. 1B illustrates an example hierarchical wireless network including a central controller.

The wireless access points 50 are operative to wirelessly communicate with remote wireless client devices 60a, 60b, 60c, and 60d. In one implementation, the wireless access points 50 implement the wireless network protocol specified in the IEEE 802.11 WLAN specification; of course, other wireless network protocols may be used. The wireless access points 50 may be autonomous or so-called "fat" wireless access points or light-weight wireless access points operating in connection with a wireless switch (FIG. 1B). In addition, the network infrastructure may also include a Wireless LAN Solution Engine (WLSE) offered by Cisco Systems, Inc. of San Jose, Calif. or another wireless network management system. In some implementations, the network infrastructure may also include one or more Wireless Control System (WCS) nodes operative to manage one or more wireless switches and access points.

B.2. Central Controller

FIG. 1B illustrates an example hierarchical wireless network including a central controller 42 according to one implementation of the present invention. In one implementation, the central controller 42 may be implemented as a wireless domain server (WDS) or, alternatively, as a wireless switch. If the central controller 42 is implemented with a WDS, the central controller 42 is operative to communicate with autonomous or so-called "fat" wireless access points. If the central controller 42 is implemented as a wireless switch, the central controller 42 is operative to communicate with light-weight wireless access points and process wireless protocol and network management information. As FIG. 1B illustrates, a central controller 42 may be directly connected to one or more access points 50. Alternatively, a central controller 42 may be operably connected to one or more access points over a switched and/or routed network environment, as FIG. 1A illustrates.

Figure 1C:
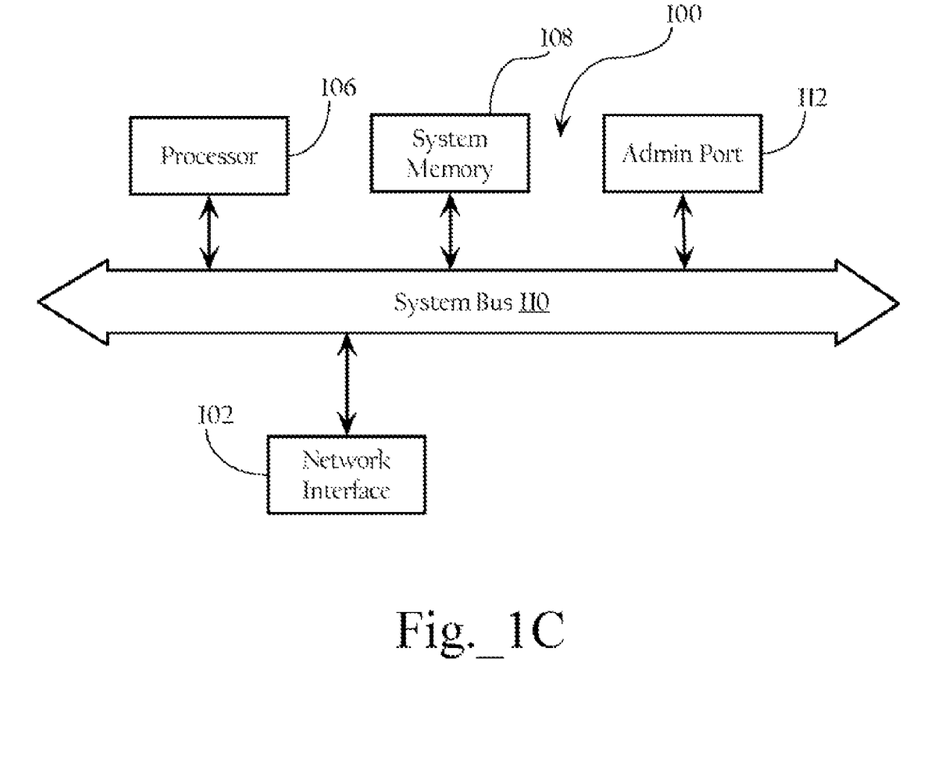
FIG. 1C illustrates an example hardware system, which may be used to implement a central controller.

FIG. 1C illustrates an example hardware system 100, which may be used to implement a controller 42. As FIG. 1C shows, in one implementation, the central controller 42 includes a network interface 102. Controller 42, in one implementation, further comprises a processor 106, a memory 108, one or more software modules stored in memory 108, including instructions for performing the functions described herein, and a system bus 110 operably connecting these components. The central control elements may optionally include an administrative port 112 allowing for administrative access for such purposes as configuration and diagnostic access.

B.3. Wireless Access Point

Figure 2:
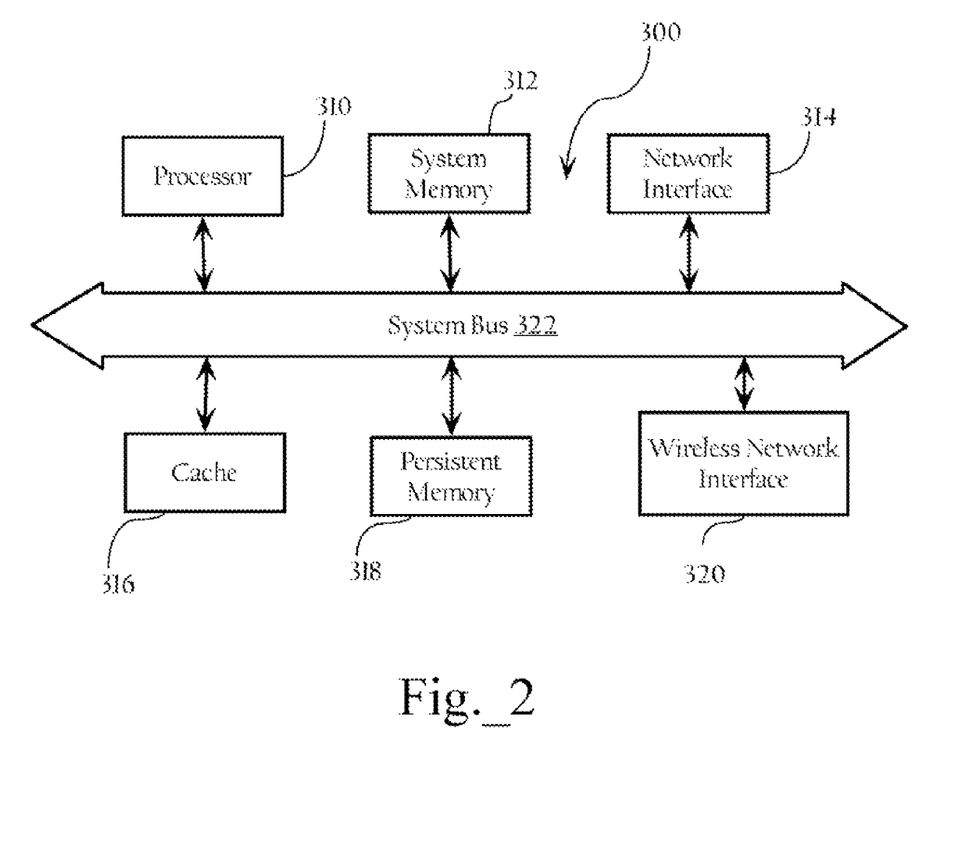
FIG. 2 illustrates an example hardware system, which may be used to implement a wireless access point.

FIG. 2 illustrates an example hardware system 300, which may be used to implement a wireless access point 50. In one implementation, the wireless access point 300 includes a processor 310, a memory 312, a network interface 314 (e.g., an 802.3 interface) for communication with a LAN, a cache 316 for storing WLAN information, a persistent memory 318, a wireless network interface 320 (e.g., an IEEE 802.11 WLAN interface) for wireless communication with one or more wireless clients 60, and a system bus 322 interconnecting these components. The wireless access points 50 may also include software modules (including Dynamic Host Configuration Protocol (DHCP) clients, transparent bridging, Lightweight Access Point Protocol (LWAPP), Cisco® Discovery Protocol (CDP) modules, wireless access point modules, Simple Network Management Protocol (SNMP) functionality, etc., and device drivers (e.g., network and WLAN interface drivers) stored in persistent memory 318 (e.g., a hard disk drive, flash memory, EEPROM, etc.). At start up, these software components are loaded into system memory 312 and then accessed and executed by processor 310.

B.4. Wireless Client

Figure 3:
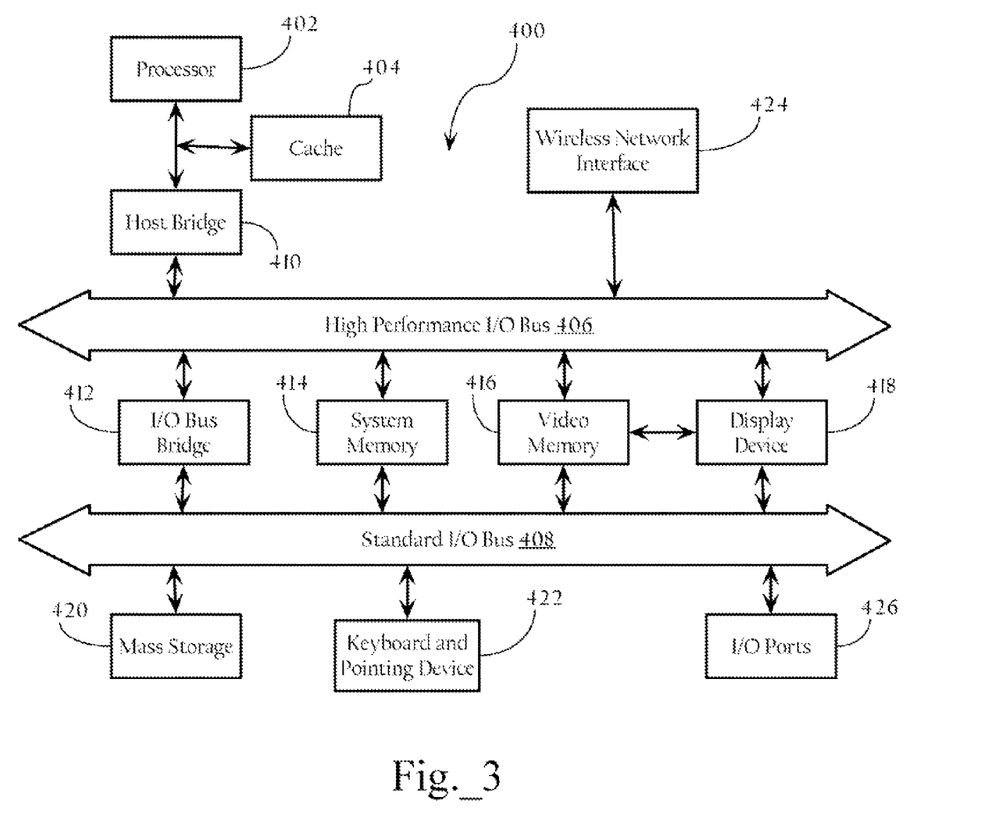
FIG. 3 illustrates an example hardware system, which may be used to implement a wireless client.

FIG. 3 illustrates an example hardware system 400, which may be used to implement a wireless client 60. In one embodiment, hardware system 400 includes a processor 402 and a cache memory 404 coupled to each other as shown. Additionally, hardware system 400 includes a high performance input/output (I/O) bus 406 and a standard I/O bus 408. A host bridge 410 couples processor 402 to high performance I/O bus 406, whereas an I/O bus bridge 412 couples the two buses 406 and 408 to each other. Hardware system 400 also includes a wireless network interface 424, a system memory 414, and a video memory 416 couple to bus 406. In turn, a display device 418 couples to video memory 416. A mass storage 420, a keyboard and pointing device 422, and I/O ports 426 couple to bus 408. Collectively, these elements are intended to represent a broad category of computer hardware systems, including but not limited to general purpose computer systems based on the Pentium® processor manufactured by Intel Corporation of Santa Clara, Calif., as well as any other suitable processor.

The remaining elements of hardware system 400 are described below. In particular, wireless network interface 424 provides communication between hardware system 400 and any of a wide range of wireless networks, such as a WLAN (i.e., IEEE 802.11), WiMax (i.e., IEEE 802.16), Cellular (e.g., Global Mobile Suppliers Association (GSMA)), etc. Mass storage 420 provides permanent storage for the data and programming instructions to perform the above described functions implemented in the system controller, whereas system memory 414 (e.g., DRAM) is used to provide temporary storage for the data and programming instructions when executed by processor 402. I/O ports 426 are one or more serial and/or parallel communication ports that provide communication between additional peripheral devices, which may couple to hardware system 400.

Hardware system 400 may include a variety of system architectures; and various components of hardware system 400 may be rearranged. For example, cache 404 may be on-chip with processor 402. Alternatively, cache 404 and processor 402 may be packed together as a "processor module," with processor 402 being referred to as the "processor core." Furthermore, certain implementations of the present invention may not require nor include all of the above components. For example, the peripheral devices shown coupled to standard I/O bus 408 may couple to high performance I/O bus 406. In addition, in some implementations only a single bus may exist, with the components of hardware system 400 being coupled to the single bus. Furthermore, hardware system 400 may include additional components, such as additional processors, storage devices, or memories.

In one embodiment, the operations of wireless client-side functionality are implemented as a series of software routines run by hardware system 400. These software routines, which can be embodied in a wireless network interface driver, comprise a plurality or series of instructions to be executed by a processor in a hardware system, such as processor 402. Initially, the series of instructions are stored on a storage device, such as mass storage 420. However, the series of instructions can be stored on any suitable storage medium, such as a diskette, CD-ROM, ROM, etc. Furthermore, the series of instructions need not be stored locally, and could be received from a remote storage device, such as a server on a network, via network/communication interface 424. The instructions are copied from the storage device, such as mass storage 420, into memory 414 and then accessed and executed by processor 402. In alternate embodiments, the present invention is implemented in hardware or firmware.

While FIG. 3 illustrates, for didactic purposes, the hardware architecture of a wireless client according to one implementation of the present invention, the wireless client may, however, be implemented on a wide variety of computer system architectures, such as special purpose, hand held or portable devices, Personal Digital Assistants (e.g., converged devices which support WLAN data+voice), Laptop computers, hand-held phones, and the like. An operating system manages and controls the operation of hardware system 400, including the input and output of data to and from software applications (not shown). The operating system provides an interface, such as a graphical user interface (GUI), between the user and the software applications being executed on the system. According to one embodiment of the present invention, the operating system is the Windows® 95/98/NT/XP operating system and/or Windows® CE (WinCE) operating system, available from Microsoft Corporation of Redmond, Wash. However, the present invention may be used with other operating systems, such as the Apple Macintosh Operating System, available from Apple Computer Inc. of Cupertino, Calif., UNIX operating systems, LINUX operating systems, Symbian operating systems, and the like.

C. Basic Wireless Network Environment for Roaming

Figure 4:
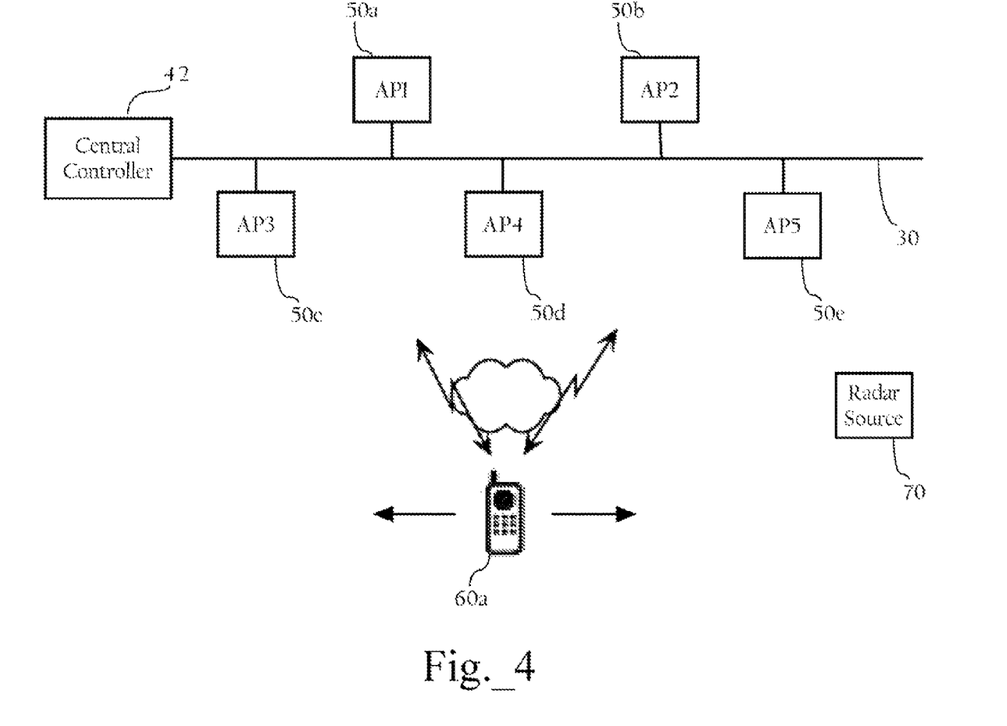
FIG. 4 illustrates an example network environment implementing a WLAN according to one implementation of the present invention.

FIG. 4 illustrates an example network environment implementing a WLAN according to one implementation of the present invention. FIG. 4 shows wireless client 60a that is associated with a wireless access point 50d and that may roam to other potential wireless access points 50a, 50b, 50c, and 50e. FIG. 4 also shows central controller 42 and a radar source 70.

In one implementation, as part of an initialization process subsequent to deployment of the wireless network infrastructure, the central controller 42 assigns an operating channel to each of the wireless access points 50a-e associated with the central controller 42. If an assigned channel is a DFS channel, any signal transmitted by one of the wireless access points 50a-e on the DFS channel may potentially interfere with the radar from the radar source 70. To prevent such interference, DFS regulations require that the wireless access points 50a-e, so-called master devices, perform a channel availability check before transmitting signals over the DFS channel. In one implementation, a channel availability check entails monitoring for radar transmissions on the DFS channel for a predetermined time period (e.g., 60 seconds). If a wireless access point detects radar, the wireless access point notifies the central controller 42 of the detection by sending a DFS notification. In one implementation, the DFS notification identifies the wireless access point, which detects the radar, and the channel on which the radar is detected. The central controller 42 will then reassign a new operating channel to the wireless access point. In the meantime, before a new channel is assigned, any wireless client or so-called slave device that is associated with the wireless access point may not transmit signals on that DFS channel. In one implementation, the central controller 42 completes these tasks within a predetermined time period (typically 10 seconds), also referred to as a channel move time, in order to maintain regulatory compliance. In one implementation, the wireless access point performs a channel availability check on any newly assigned operating channel.

In one implementation, if a given wireless access point 50 is operating on a DFS channel and it does not initially detect radar on the DFS channel during the channel availability check, the wireless access point 50 may transmit signals on the DFS channel. If and when the wireless access point does detect radar, the wireless access point notifies the central controller 42, which will then reassign a new operating channel to the wireless access point. If for any reason the central controller 42 assigns a new channel to a given wireless access point, the wireless access point 50 will perform a channel availability check prior to commencing transmissions on that channel, if the new channel is a DFS channel not known to be free from radar. In one implementation, another wireless access point may monitor the same channel to which an wireless access point having detected radar is moved; thus, that channel is known to be free from radar. The central controller 42 communicates this knowledge to the wireless access point 50 which subsequently begins transmissions without first performing a chancel availability check.

In one implementation, this process continues until all wireless access points are operating/transmitting on channels known to be free from radar. In one implementation, the central controller 42 may complete these tasks within a predetermined time period (typically 10 seconds), also referred to as a channel move time, in order to maintain regulatory compliance.

In one implementation, because the channel move time is much shorter than the channel availability check (i.e., 10 seconds versus 60 seconds), the neighbor lists may be regenerated immediately and re-transmitted to wireless clients in order to stop wireless client transmissions on that channel. In one implementation, because the new channel may not be used by wireless clients until the wireless access point has performed the channel availability check, the neighbor lists may be quickly updated by simply removing the DFS enable indication on the wireless access point that detected radar. As described in more detail below, the DFS enable indication indicates if a channel availability check is required before performing active scanning. The updated neighbor lists are then transmitted to all wireless access points (and wireless clients) whose old neighbor lists contained a wireless access point on that operating channel. Alternatively, in one implementation, the new neighbor list may be updated excluding the wireless access point which was assigned to the new operating channel. Once the new channel is known to be free from radar, the central controller 42 may again update another neighbor list to include the wireless access point, corresponding channel, and DFS enable indication, and the send the neighbor list to the wireless access points and wireless clients.

C.1. Neighbor Lists with DFS Enable Indications

In one implementation, wireless access points 50 transmit neighbor report frames to other wireless access points operating on the same channel as well as to wireless access points operating on different channels. These neighbor report frames are forwarded to the central controller 42. After a while, the radio resource management (RRM) algorithms on the central controller 42 determine all of the radio frequency (RF) adjacencies of the wireless access points (i.e., which wireless access points are close to one another from an RF connectivity perspective) and can generate a neighbor list for each wireless access points. In a particular implementation, a neighbor list identifies, for a given access point, the neighboring access points within the RF range of that access point. In one implementation, the neighbor list can be determined relative to a threshold signal strength level. As described in more detail below in connection with FIG. 5, when the wireless network infrastructure generates neighbor lists, a DFS enable indication is included for each wireless access point in the list whose corresponding channel number and band require DFS compliance. If the wireless network infrastructure is not configured for this service, then this indication will not be present. In one implementation, the central controller 42 maintains a neighbor list for each wireless access point 50, and each neighbor list indicates, for each neighboring wireless access point, if a channel availability check is required.

Figure 5:
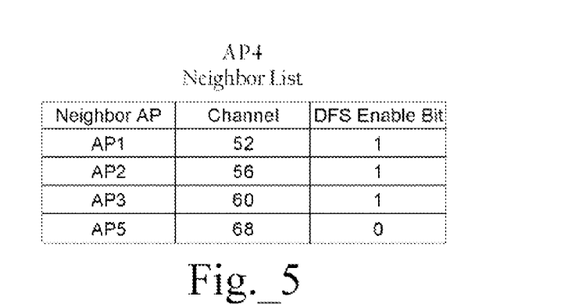
FIG. 5 illustrates an example neighbor list associated with a given wireless access point.

FIG. 5 illustrates an example neighbor list associated with a given wireless access point. As FIG. 5 shows, in one implementation, the neighbor list includes the media access control (MAC) address or Basic Service Set Identifier (BSSID) for wireless access points 50a, 50b, 50c, and 50e that neighbor the given wireless access point 50d. For ease of illustration, the addresses are represented by the labels AP1, AP2, AP3, and AP5, which may represent wireless access point addresses. The neighbor list also includes the respective operating channels (e.g., channel number and band) of those neighboring wireless access points. In one implementation, the wireless access points listed in the neighbor list are included based on radio frequency (RF) connectivity. In other words, the neighbor list includes detectable wireless access points (e.g., detectible by wireless access point 50d). The neighbor list also includes a DFS enabling bit for each neighboring wireless access point.

In particular implementations, the DFS enabling bit indicates if a channel availability check is required before performing active scanning. For example, in one implementation, the DFS enabling bit being enabled (e.g., set to "1") indicates that the channel availability check has been performed and the coverage area for the corresponding wireless access point (e.g., AP1) has been determined to be radar free on that DFS channel. As such, a wireless client referencing the neighbor list would not be required to perform a channel availability check and may immediately perform active scanning without violating DFS regulation requirements.

If the DFS enabling bit is not enabled (e.g., cleared to "0"), a channel availability check is required before performing active scanning. FIG. 5 shows an example DFS enabling bit that is not enabled (e.g., associated with AP5). In particular implementations, the central controller 42 may eventually remove the wireless access point from the neighbor list.

As described in more detail below in connection with FIG. 5, when the channel availability check is required, a wireless client will passively scan a channel searching for an enabling signal (e.g., a beacon or mini-beacon such as an 802.11k measurement pilot, etc.) for the channel availability check time in order to determine if transmission is permissible.

In channels requiring DFS operation, wireless access points perform in-service monitoring for radar transmissions and provide enabling signals. If a wireless client detects an enabling signal, the wireless client may assume that the channel is free of radar and would not be required to perform a channel availability check prior to initiating transmission on that channel. If during the channel availability check, the wireless client cycles through one or more channels multiple times searching for a transmission from an AP, it is possible for the wireless client to miss an enabling signal. As a result the client spends a relatively significant amount of time off the channel, which may result in impairments to real-time traffic streams (e.g., voice). Accordingly, the DFS enabling bit being enabled (e.g., "1") eliminates the need to perform the channel availability check associated with passive scanning. This may result in improved performance (e.g., improved audio quality, battery life, etc.), because the wireless client may actively probe on these DFS channels with the DFS enabling bit is set.

In one implementation, the central controller 42 may transmit the neighbor list to wireless clients as an extension to any suitable management frame or data frame (e.g., in a Cisco Compatible Extensions (CCX) neighbor report, 802.11k neighbor report, beacon, etc.). In one implementation, the management frame or data frame may include a DFS information sub-element that contains information on the whether the management or data frame may be used for DFS enable functionality. In one implementation, the sub-element may identify whether the corresponding neighbor report, which details wireless access points and corresponding channel numbers and bands may be used as an enabling signal for that channel.

In one implementation, the sub-element may only be present in a neighbor report information elements (IEs) whose corresponding channel number and band require DFS operation. In one implementation, if the wireless infrastructure is not configured for or does not otherwise support using the neighbor report IE as an enabling signal, the sub-element may not be present.

For ease of illustration, implementations of the present invention are been described where the central controller 42 generates, maintains, and distributes the neighbor list. However, in other implementations, other wireless network infrastructure elements such as wireless access points may perform these functions in wireless networks such as those described herein or in other types of networks such as wireless mesh networks.

C.2. Neighbor List Updates

Figure 6:
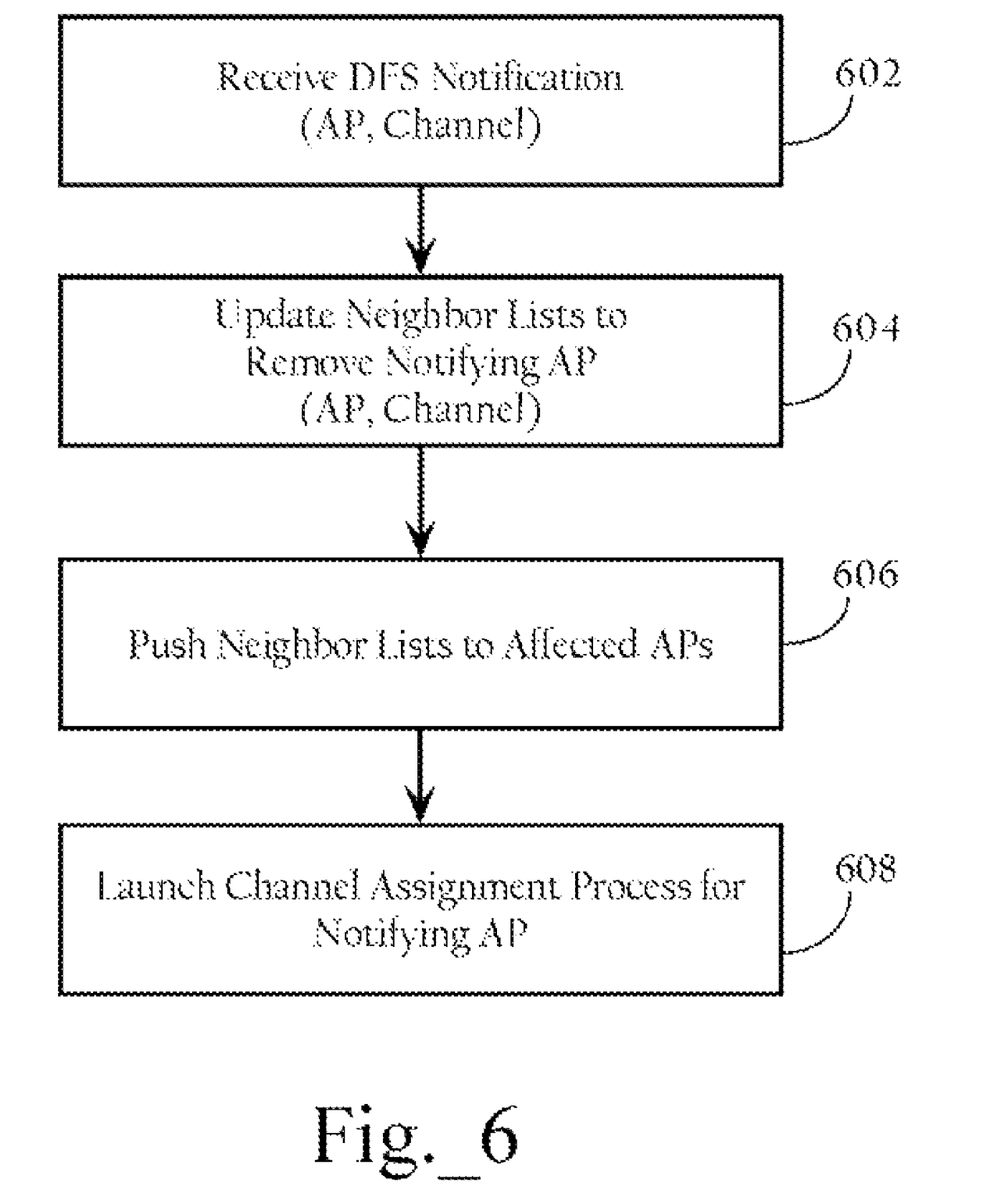
FIG. 6 illustrates an example process flow implemented at the central controller and associated with updating the neighbor list.

FIG. 6 illustrates an example process flow implemented at the central controller 42 and associated with updating neighbor lists for one or more access points. As FIG. 6 shows, the central controller 42 receives a DFS notification from a wireless access point (602). As indicated above, the DFS notification identifies a wireless access point that has detected the radar and the corresponding channel on which the access point was operating. The central controller 42 then updates the neighbor lists of one or more neighboring access points to remove the notifying wireless access point from the respective neighbor lists (604). In an alternative embodiment, the central controller 42 may update the neighbor list to set the DFS enabled bit to "0," to clear the DFS enabling bit for that access point and channel. The central controller 42 then pushes the updated neighbor lists to the affected wireless access points (606). The central controller 42 then launches a channel assignment process for the notifying wireless access point (608). As described in more detail below in connection to FIG. 6, the channel assignment process assigns a new channel to the affected wireless access point. The channel assignment process may also precede or occur in parallel with pushing the neighbor lists to the affected wireless access points.

In one implementation, a central controller 42, which is operably connected with one or more central controllers in the LAN, communicates to them when a radar is detected by one of its wireless access points. When the other central controllers receive this message (i.e., that radar was detected on a certain channel), they update their neighbor lists as described in the preceding paragraph.

Figure 7:
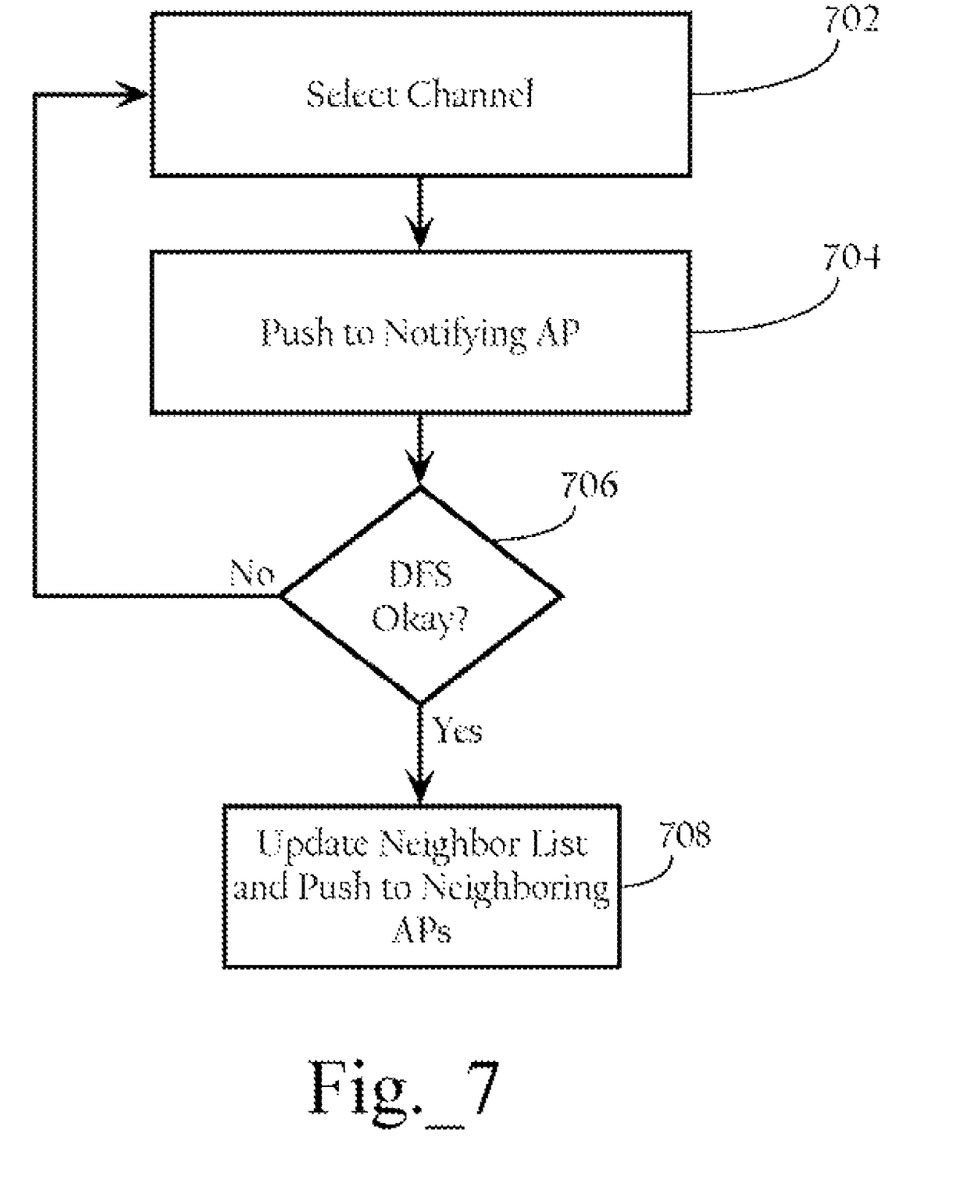
FIG. 7 illustrates an example process flow implemented at the central controller and associated with a channel assignment process.

FIG. 7 illustrates an example process flow implemented at the central controller 42 and associated with a channel assignment process. As FIG. 7 shows, the central controller 42 selects another channel for the wireless access point (702). The central controller 42 then pushes the selected channel to the affected wireless access point (704). If new channel is a DFS channel not known to be free from radar, the wireless access point performs a channel availability check. In one implementation, the wireless access point performs a channel availability check on the new channel and notifies the central controller 42 of the results. Based on the results, the central controller 42 determines if the coverage area for the wireless access point is radar free relative to the new channel (706). If not, the central controller 42 selects another channel (702). If the coverage area for the wireless access point is radar free relative to the new channel (e.g., the new channel is not a DFS channel or is a DFS channel known to be free of radar), the central controller 42 updates the neighbor lists and pushes the updated neighbor lists to the neighboring wireless access points (708), and may optionally push the neighbor list directly to one or more wireless clients via the wireless access points. In one implementation, wireless access points may transmit the neighbor list to any clients that may be associated with the wireless access points.

Figure 8:
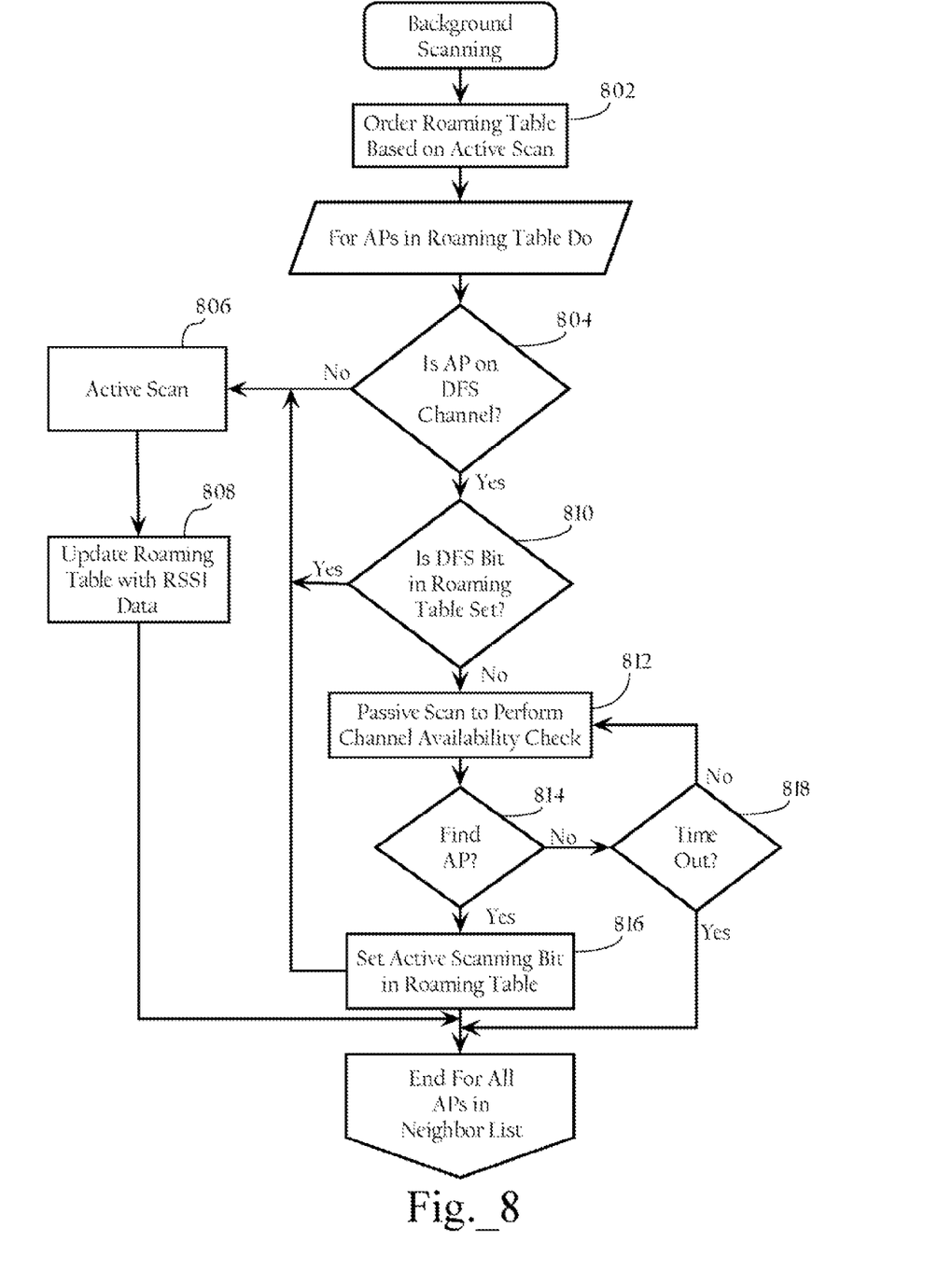
FIG. 8 illustrates an example process flow implemented at a wireless client and associated with background scanning.

FIG. 8 illustrates an example process flow, implemented at a wireless client 60, directed to a background scanning process that uses the DFS enabling information in the neighbor lists. As FIG. 8 shows, the wireless client 60, in a background process, orders or prioritizes a roaming table based on active and passive scanning to determine the best candidate wireless access points to associate with during a roam event (802). For example, in one implementation, the roaming table may include a first-tier, high-priority list of wireless access points. Such wireless access points may be preferred due to higher RSSI values, for example. The first-tier list may also include wireless access points operating on DFS channels. The roaming table may include a second-tier, low-priority list of wireless access points. Even though a given wireless client is not currently physically roaming, it may be useful for the wireless client 60 to periodically scan the RF coverage area to determine the optimal wireless access points for possible future physical roaming events. In one implementation, the wireless client 60 may logically roam when the RSSI value of the wireless access point 50 to which the wireless client 60 is currently associated drops below a predetermined threshold.

In one implementation, when the wireless client 60 receives a neighbor list from the central controller 42 or a wireless access point 50, the wireless client 60 merges the neighbor list with the roaming table of the wireless client 60. For each wireless access point 50 in the neighbor list, the wireless client 60 determines if the wireless access point is on a DFS channel (804). If not, the wireless client 60 may perform an active scan (806) after which the wireless client 60 updates the roaming table with RSSI information from the active scan (808).

If the wireless access point is on a DFS channel, the wireless client 60 determines if the DFS enabling bit in the roaming table is set (810). As described above, if the DFS enabling bit is set, the wireless client 60 may perform an active scan (806). Active scanning enables the wireless client to more quickly determine the best candidate wireless access point, because the wireless client need not passively wait for an wireless access points to transmit an enabling signal or beacon. This is especially helpful in minimizing audio disruption when the wireless client has an active Voice over Internet Protocol (VoIP) or Video over Internet Protocol call. Scanning optimized in this manner also provides for improved power consumption, thereby extending battery life.

Otherwise, if the DFS enabling bit is not set, the wireless client 60 performs a passive scan to determine channel availability (812). As described above, a passive scan involves monitoring for enabling signals or beacons from a wireless access point. An enabling signal or beacon indicates that the sending wireless access point (i.e., master) has performed a channel availability check and that it is clear to transmit signals on the DFS channel. If the wireless client 60 finds an available wireless access point (814), the wireless client 60 sets the DFS enabling bit for that wireless access point in the roaming table (816). If the wireless client 60 has not found an available wireless access point, the wireless client 60 may continue to perform a passive scan until the wireless client 60 finds an available wireless access point, as long as there is no time out (818). The wireless client 60 may use this roaming table during a roam event.

If a wireless client receives an updated neighbor list, it checks if one of the AP entries was removed. If so, the wireless client must assume the wireless access point entry was removed due to detection of a radar signal and cease transmitting on that wireless access point's corresponding channel. This is to ensure that Channel Closing Transmission Time is not exceeded (the aggregate sum of transmission durations beginning when radar was detected and ending when transmissions cease from all wireless devices operating on that channel and is typically limited to 260 milliseconds). Similarly, if a wireless client receives an updated neighbor list, it checks all the wireless access points' DFS enable bits. For any DFS enable bit whose value was changed from 1 to 0, the wireless client must assume the bit was changed due to detection of a radar signal and must cease transmitting on that wireless access point's corresponding channel. This is to ensure that Channel Closing Transmission Time is not exceeded.

In one implementation, the neighbor list explicitly includes bits indicating a radar transmission was detected on that wireless access point's corresponding channel. When a wireless client receives a neighbor list with these bits set, it must not transmit on that channel. Typically this indication will only be included in the neighbor list immediately after radar is detected and remain in the neighbor list while the central controller and wireless access point are selecting a new operating channel. Once this operation is completed, the indication is removed.

The present invention has been explained with reference to specific embodiments. For example, while embodiments of the present invention have been described as operating in connection with IEEE 802.11 networks, the present invention can be used in connection with any suitable wireless network environment. Other embodiments will be evident to those of ordinary skill in the art. It is therefore not intended that the present invention be limited, except as indicated by the appended claims.

What is claimed is:

1. Logic encoded in one or more tangible media for execution and when executed operable to:
   receive a notification that identifies a wireless access point that detects radar on an operating channel and identifies the operating channel;
   update neighbor lists of one or more neighboring wireless access points to remove the wireless access point from the neighbor list, wherein the neighbor list comprises neighbor wireless access points, corresponding operating channels, and corresponding enable indications, wherein each enable indication indicates if a channel availability check is required before performing active scanning; and
   transmit the updated neighbor list to the neighboring wireless access points.

2. The logic of claim 1 wherein the logic is further operable to reassign a new operating channel to the wireless access point.

3. The logic of claim 2 wherein, to reassign the new operating channel to the wireless access point, the logic is further operable to:
   select a new operating channel and transmit an indication of the new operating channel to the wireless access point;
   determine if the wireless access point detects radar on the new operating channel;
   if the wireless access point detects radar on the new operating channel, select and transmit an alternative operating channel to the wireless access point;
   if the wireless access point does not detect radar on the new operating channel, update the neighbor lists to include the wireless access point, the new operating channel, and an enable indication indicating that a channel availability check is not required before performing active scanning; and
   transmit the updated neighbor lists to the wireless access point and the neighbor wireless access points listed in the neighbor list.

4. The logic of claim 1 wherein the enable indication is a bit that toggles between "1" and "0," wherein a "1" indicates that a channel availability check is not required before performing active scanning, and wherein a "0" indicates that a channel availability check is required before performing active scanning.

5. The logic of claim 1 wherein when other central controllers receive the radar detection indication, the other central controllers update their neighbor lists.

6. A method comprising:
   receiving, at one or more computing devices, a notification that identifies a wireless access point that detects radar on an operating channel and identifies the operating channel;
   updating, by the one or more computing devices, neighbor lists of one or more neighboring wireless access points to remove the wireless access point from the neighbor list, wherein the neighbor list comprises neighbor wireless access points, corresponding operating channels, and corresponding enable indications, wherein each enable indication indicates if a channel availability check is required before performing active scanning; and
   transmitting, by the one or more computing devices, the updated neighbor list to the neighboring wireless access points.

7. The method of claim 6 further comprising reassigning a new operating channel to the wireless access point.

8. The method of claim 7 further comprising:
   selecting a new operating channel and transmitting an indication of the new operating channel to the wireless access point;
   determining if the wireless access point detects radar on the new operating channel;
   if the wireless access point detects radar on the new operating channel, selecting and transmitting an alternative operating channel to the wireless access point;
   if the wireless access point does not detect radar on the new operating channel, updating the neighbor lists to include the wireless access point, the new operating channel, and an enable indication indicating that a channel availability check is not required before performing active scanning; and
   transmitting the updated neighbor lists to the wireless access point and the neighbor wireless access points listed in the neighbor list.

9. The method of claim 6 wherein the enable indication is a bit that toggles between "1" and "0," wherein a "1" indicates that a channel availability check is not required before performing active scanning, and wherein a "0" indicates that a channel availability check is required before performing active scanning.

10. The method of claim 6 wherein when other central controllers receive the radar detection, the other central controllers update their neighbor lists.

11. An apparatus comprising:
   means for receiving a notification that identifies a wireless access point that detects radar on an operating channel and identifies the operating channel;
   means for updating neighbor lists of one or more neighboring wireless access points to remove the wireless access point from the neighbor list, wherein the neighbor list comprises neighbor wireless access points, corresponding operating channels, and corresponding enable indications, wherein each enable indication indicates if a channel availability check is required before performing active scanning; and means for transmitting the updated neighbor list to the neighboring wireless access points.

12. The apparatus of claim 11 further comprising means for reassigning a new operating channel to the wireless access point.

13. The apparatus of claim 12 further comprising:

means for selecting a new operating channel and transmitting an indication of the new operating channel to the wireless access point;

means for determining if the wireless access point detects radar on the new operating channel;

if the wireless access point detects radar on the new operating channel, means for selecting and transmitting an alternative operating channel to the wireless access point;

if the wireless access point does not detect radar on the new operating channel, means for updating the neighbor lists to include the wireless access point, the new operating channel, and an enable indication indicating that a channel availability check is not required before performing active scanning; and means for transmitting the updated neighbor lists to the neighboring wireless access points and the neighbor wireless access points listed in the neighbor list.

14. The apparatus of claim 11 wherein the enable indication is a bit that toggles between "1" and "0," wherein a "1" indicates that a channel availability check is not required before performing active scanning, and wherein a "0" indicates that a channel availability check is required before performing active scanning.

15. Logic encoded in one or more tangible media for execution and when executed operable to:

receive a neighbor list comprising neighbor wireless access points, corresponding operating channels, and corresponding enable indications, wherein each enable indication indicates if a channel availability check is required before performing active scanning; and perform active scanning if a channel availability check is not required before performing active scanning.

16. The logic of claim 15 wherein the logic is further operable to prioritize wireless access points in a roaming table based on active scanning, wherein the roaming table includes neighbor wireless access points and corresponding received signal strength values.

17. The logic of claim 15 wherein the logic is further operable to perform passive scanning if a channel availability check is required before performing active scanning, and wherein passive scanning comprises monitoring for an enabling signal from a wireless access point.

18. The logic of claim 15 wherein the logic is further operable to perform passive scanning if a channel availability check is required before performing active scanning, wherein passive scanning comprises monitoring for an enabling signal from a wireless access point, and wherein the enabling signal indicates that the wireless access point has performed a channel availability check and that it is clear to transmit signals on the operating channel.

19. A method comprising:

receiving, at one or more computing devices, a neighbor list comprising neighbor wireless access points, corresponding operating channels, and corresponding enable indications, wherein each enable indication indicates if a channel availability check is required before performing active scanning; and performing, by the one or more computing devices, active scanning if a channel availability check is not required before performing active scanning.

20. The method of claim 19 further comprising prioritizing wireless access points in a roaming table based on active scanning, wherein the roaming table includes neighbor wireless access points and corresponding received signal strength values.

21. The method of claim 19 further comprising performing passive scanning if a channel availability check is required before performing active scanning, and wherein passive scanning comprises monitoring for an enabling signal from a wireless access point.

22. The method of claim 19 further comprising performing passive scanning if a channel availability check is required before performing active scanning, wherein passive scanning comprises monitoring for an enabling signal from a wireless access point, and wherein the enabling signal indicates that the wireless access point has performed a channel availability check and that it is clear to transmit signals on the operating channel.

23. An apparatus comprising:

means for receiving a neighbor list comprising neighbor wireless access points, corresponding operating channels, and corresponding enable indications, wherein each enable indication indicates if a channel availability check is required before performing active scanning; and means for performing active scanning if a channel availability check is not required before performing active scanning.

24. The apparatus of claim 23 further comprising means for prioritizing wireless access points in a roaming table based on active scanning, wherein the roaming table includes neighbor wireless access points and corresponding received signal strength values.

25. The apparatus of claim 23 further comprising means for performing passive scanning if a channel availability check is required before performing active scanning, and wherein passive scanning comprises monitoring for an enabling signal from a wireless access point.

* * * * *